(12) United States Patent
Lelescu et al.

(10) Patent No.: US 10,542,208 B2
(45) Date of Patent: *Jan. 21, 2020

(54) SYSTEMS AND METHODS FOR SYNTHESIZING HIGH RESOLUTION IMAGES USING IMAGE DECONVOLUTION BASED ON MOTION AND DEPTH INFORMATION

(71) Applicant: FotoNation Limited, Galway (IE)

(72) Inventors: Dan Lelescu, Morgan Hill, CA (US); Thang Duong, Bellevue, WA (US)

(73) Assignee: FotoNation Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,168

(22) Filed: Apr. 23, 2018

(65) Prior Publication Data

US 2018/0302554 A1    Oct. 18, 2018

Related U.S. Application Data

(63) Continuation of application No. 15/258,947, filed on Sep. 7, 2016, now Pat. No. 9,955,070, which is a (Continued)

(51) Int. Cl.
*H04N 5/232* (2006.01)
*G06T 7/80* (2017.01)
(Continued)

(52) U.S. Cl.
CPC ......... *H04N 5/23232* (2013.01); *G06T 5/003* (2013.01); *G06T 7/20* (2013.01); (Continued)

(58) Field of Classification Search
CPC .......... H04N 5/23232; H04N 5/23258; H04N 5/35545; H04N 5/2226; H04N 5/2258; (Continued)

(56) References Cited

U.S. PATENT DOCUMENTS 4,124,798 A    11/1978  Thompson
4,198,646 A     4/1980  Alexander et al.
(Continued)

FOREIGN PATENT DOCUMENTS

CN    1669332 A    9/2005
CN    1839394 A    9/2006
(Continued)

OTHER PUBLICATIONS

International Preliminary Report on Patentability for International Application PCT/US2014/022774, dated Sep. 22, 2015, dated Oct. 1, 2015, 5 Pgs.

(Continued)

*Primary Examiner* — Albert H Cutler
(74) *Attorney, Agent, or Firm* — KPPB LLP

(57) ABSTRACT

Systems and methods for synthesizing high resolution images using image deconvolution and depth information in accordance embodiments of the invention are disclosed. In one embodiment, an array camera includes a processor and a memory, wherein an image deconvolution application configures the processor to obtain light field image data, determine motion data based on metadata contained in the light field image data, generate a depth-dependent point spread function based on the synthesized high resolution image, the depth map, and the motion data, measure the quality of the synthesized high resolution image based on the generated depth-dependent point spread function, and when the measured quality of the synthesized high resolution image is within a quality threshold, incorporate the synthesized high resolution image into the light field image data.

20 Claims, 7 Drawing Sheets

Related U.S. Application Data continuation of application No. 14/200,629, filed on Mar. 7, 2014, now Pat. No. 9,445,003.

(60) Provisional application No. 61/788,078, filed on Mar. 15, 2013.

(51) Int. Cl.
  *G06T 7/20* (2017.01)
  *G06T 5/00* (2006.01)
  *H04N 5/355* (2011.01)
  *H04N 5/225* (2006.01)
  *H04N 5/222* (2006.01)

(52) U.S. Cl.
  CPC .......... *G06T 7/80* (2017.01); *H04N 5/2226* (2013.01); *H04N 5/2258* (2013.01); *H04N 5/23258* (2013.01); *H04N 5/35545* (2013.01); *G06T 2200/21* (2013.01); *G06T 2207/10028* (2013.01); *G06T 2207/10052* (2013.01); *G06T 2207/20201* (2013.01); *G06T 2207/20221* (2013.01); *H04N 5/23251* (2013.01); *H04N 5/23264* (2013.01)

(58) Field of Classification Search
  CPC .. H04N 5/23264; H04N 5/23251; G06T 7/80; G06T 7/20; G06T 5/003; G06T 2207/20221; G06T 2207/10028; G06T 2207/20201; G06T 2207/10052; G06T 2200/21
  See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 5,005,083 A | 4/1991 | Grage |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt |
| 5,327,125 A | 7/1994 | Iwase et al. |
| 5,488,674 A | 1/1996 | Burt |
| 5,629,524 A | 5/1997 | Stettner et al. |
| 5,638,461 A | 6/1997 | Fridge |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,443,579 B1 | 9/2002 | Myers |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George |
| 6,958,862 B1 | 10/2005 | Joseph |
| 6,985,175 B2 | 1/2006 | Iwai et al. |
| 7,015,954 B1 | 3/2006 | Foote et al. |
| 7,085,409 B2 | 8/2006 | Sawhney |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Grossberg et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,430,312 B2 | 9/2008 | Gu |
| 7,496,293 B2 | 2/2009 | Shamir et al. |
| 7,564,019 B2 | 7/2009 | Olsen |
| 7,599,547 B2 | 10/2009 | Sun et al. |
| 7,606,484 B1 | 10/2009 | Richards et al. |
| 7,620,265 B1 | 11/2009 | Wolff |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Mitsunaga et al. |
| 7,956,871 B2 | 6/2011 | Fainstain et al. |

(56) References Cited

U.S. PATENT DOCUMENTS

| | | | |
|---|---|---|---|
| 7,965,314 B1 | 6/2011 | Miller et al. | |
| 7,973,834 B2 | 7/2011 | Yang | |
| 7,986,018 B2 | 7/2011 | Rennie | |
| 7,990,447 B2 | 8/2011 | Honda et al. | |
| 8,000,498 B2 | 8/2011 | Shih et al. | |
| 8,013,904 B2 | 9/2011 | Tan et al. | |
| 8,027,531 B2 | 9/2011 | Wilburn et al. | |
| 8,044,994 B2 | 10/2011 | Vetro et al. | |
| 8,055,466 B2 | 11/2011 | Bryll | |
| 8,077,245 B2 | 12/2011 | Adamo et al. | |
| 8,089,515 B2 | 1/2012 | Chebil et al. | |
| 8,098,297 B2 | 1/2012 | Crisan et al. | |
| 8,098,304 B2 | 1/2012 | Pinto et al. | |
| 8,106,949 B2 | 1/2012 | Tan et al. | |
| 8,111,910 B2 | 2/2012 | Tanaka | |
| 8,126,279 B2 | 2/2012 | Marcellin et al. | |
| 8,130,120 B2 | 3/2012 | Kawabata et al. | |
| 8,131,097 B2 | 3/2012 | Lelescu et al. | |
| 8,149,323 B2 | 4/2012 | Li | |
| 8,164,629 B1 | 4/2012 | Zhang | |
| 8,169,486 B2 | 5/2012 | Corcoran et al. | |
| 8,180,145 B2 | 5/2012 | Wu et al. | |
| 8,189,065 B2 | 5/2012 | Georgiev et al. | |
| 8,189,089 B1* | 5/2012 | Georgiev | G02B 27/1066 348/343 |
| 8,194,296 B2 | 6/2012 | Compton | |
| 8,212,914 B2 | 7/2012 | Chiu | |
| 8,213,711 B2 | 7/2012 | Tam | |
| 8,231,814 B2 | 7/2012 | Duparre | |
| 8,242,426 B2 | 8/2012 | Ward et al. | |
| 8,244,027 B2 | 8/2012 | Takahashi | |
| 8,244,058 B1 | 8/2012 | Intwala et al. | |
| 8,254,668 B2 | 8/2012 | Mashitani et al. | |
| 8,279,325 B2 | 10/2012 | Pitts et al. | |
| 8,280,194 B2 | 10/2012 | Wong et al. | |
| 8,284,240 B2 | 10/2012 | Saint-Pierre et al. | |
| 8,289,409 B2 | 10/2012 | Chang | |
| 8,289,440 B2 | 10/2012 | Pitts et al. | |
| 8,290,358 B1 | 10/2012 | Georgiev | |
| 8,294,099 B2 | 10/2012 | Blackwell, Jr. | |
| 8,294,754 B2 | 10/2012 | Jung et al. | |
| 8,300,085 B2 | 10/2012 | Yang et al. | |
| 8,305,456 B1 | 11/2012 | McMahon | |
| 8,315,476 B1 | 11/2012 | Georgiev et al. | |
| 8,345,144 B1 | 1/2013 | Georgiev et al. | |
| 8,360,574 B2 | 1/2013 | Ishak et al. | |
| 8,400,555 B1 | 3/2013 | Georgiev | |
| 8,406,562 B2 | 3/2013 | Bassi et al. | |
| 8,411,146 B2 | 4/2013 | Twede | |
| 8,446,492 B2 | 5/2013 | Nakano et al. | |
| 8,456,517 B2 | 6/2013 | Mor et al. | |
| 8,493,496 B2 | 7/2013 | Freedman et al. | |
| 8,514,291 B2 | 8/2013 | Chang | |
| 8,514,491 B2 | 8/2013 | Duparre | |
| 8,541,730 B2 | 9/2013 | Inuiya | |
| 8,542,933 B2 | 9/2013 | Venkataraman | |
| 8,553,093 B2 | 10/2013 | Wong et al. | |
| 8,559,756 B2 | 10/2013 | Georgiev et al. | |
| 8,565,547 B2 | 10/2013 | Strandemar | |
| 8,576,302 B2 | 11/2013 | Yoshikawa | |
| 8,577,183 B2 | 11/2013 | Robinson | |
| 8,581,995 B2 | 11/2013 | Lin et al. | |
| 8,619,082 B1 | 12/2013 | Ciurea et al. | |
| 8,648,918 B2 | 2/2014 | Kauker et al. | |
| 8,648,919 B2* | 2/2014 | Mantzel | H04N 5/2329 348/208.6 |
| 8,655,052 B2 | 2/2014 | Spooner et al. | |
| 8,682,107 B2 | 3/2014 | Yoon et al. | |
| 8,687,087 B2 | 4/2014 | Pertsel et al. | |
| 8,692,893 B2 | 4/2014 | McMahon | |
| 8,754,941 B1 | 6/2014 | Sarwari et al. | |
| 8,773,536 B1 | 7/2014 | Zhang | |
| 8,780,113 B1 | 7/2014 | Ciurea et al. | |
| 8,804,255 B2 | 8/2014 | Duparre | |
| 8,823,813 B2* | 9/2014 | Mantzel | H04N 5/23248 348/208.6 |
| 8,830,375 B2 | 9/2014 | Ludwig | |
| 8,831,367 B2 | 9/2014 | Venkataraman | |
| 8,836,793 B1 | 9/2014 | Kriesel et al. | |
| 8,842,201 B2 | 9/2014 | Tajiri | |
| 8,854,462 B2 | 10/2014 | Herbin et al. | |
| 8,861,089 B2 | 10/2014 | Duparre | |
| 8,866,912 B2 | 10/2014 | Mullis | |
| 8,866,920 B2 | 10/2014 | Venkataraman et al. | |
| 8,866,951 B2 | 10/2014 | Keelan | |
| 8,878,950 B2 | 11/2014 | Lelescu et al. | |
| 8,885,059 B1 | 11/2014 | Venkataraman et al. | |
| 8,885,922 B2 | 11/2014 | Ito et al. | |
| 8,896,594 B2 | 11/2014 | Xiong et al. | |
| 8,896,719 B1 | 11/2014 | Venkataraman et al. | |
| 8,902,321 B2 | 12/2014 | Venkataraman et al. | |
| 8,928,793 B2 | 1/2015 | McMahon | |
| 8,977,038 B2 | 3/2015 | Tian et al. | |
| 9,001,226 B1 | 4/2015 | Ng et al. | |
| 9,019,426 B2 | 4/2015 | Han et al. | |
| 9,025,894 B2 | 5/2015 | Venkataraman | |
| 9,025,895 B2 | 5/2015 | Venkataraman | |
| 9,030,528 B2 | 5/2015 | Pesach et al. | |
| 9,031,335 B2 | 5/2015 | Venkataraman | |
| 9,031,342 B2 | 5/2015 | Venkataraman | |
| 9,031,343 B2 | 5/2015 | Venkataraman | |
| 9,036,928 B2 | 5/2015 | Venkataraman | |
| 9,036,931 B2 | 5/2015 | Venkataraman et al. | |
| 9,041,823 B2 | 5/2015 | Venkataraman et al. | |
| 9,041,824 B2 | 5/2015 | Lelescu et al. | |
| 9,041,829 B2 | 5/2015 | Venkataraman et al. | |
| 9,042,667 B2 | 5/2015 | Venkataraman et al. | |
| 9,047,684 B2 | 6/2015 | Lelescu et al. | |
| 9,049,367 B2 | 6/2015 | Venkataraman et al. | |
| 9,055,233 B2 | 6/2015 | Venkataraman et al. | |
| 9,060,120 B2 | 6/2015 | Venkataraman et al. | |
| 9,060,124 B2 | 6/2015 | Venkataraman et al. | |
| 9,077,893 B2 | 7/2015 | Venkataraman et al. | |
| 9,094,661 B2 | 7/2015 | Venkataraman et al. | |
| 9,100,586 B2 | 8/2015 | McMahon et al. | |
| 9,100,635 B2 | 8/2015 | Duparre et al. | |
| 9,123,117 B2 | 9/2015 | Ciurea et al. | |
| 9,123,118 B2 | 9/2015 | Ciurea et al. | |
| 9,124,815 B2 | 9/2015 | Venkataraman et al. | |
| 9,124,831 B2 | 9/2015 | Mullis | |
| 9,124,864 B2 | 9/2015 | Mullis | |
| 9,128,228 B2 | 9/2015 | Duparre | |
| 9,129,183 B2 | 9/2015 | Venkataraman et al. | |
| 9,129,377 B2 | 9/2015 | Ciurea et al. | |
| 9,143,711 B2 | 9/2015 | McMahon | |
| 9,147,254 B2 | 9/2015 | Florian et al. | |
| 9,185,276 B2 | 11/2015 | Rodda et al. | |
| 9,188,765 B2 | 11/2015 | Venkataraman et al. | |
| 9,191,580 B2 | 11/2015 | Venkataraman et al. | |
| 9,197,821 B2 | 11/2015 | McMahon | |
| 9,210,392 B2 | 12/2015 | Nisenzon et al. | |
| 9,214,013 B2 | 12/2015 | Venkataraman et al. | |
| 9,235,898 B2 | 1/2016 | Venkataraman et al. | |
| 9,235,900 B2 | 1/2016 | Ciurea et al. | |
| 9,240,049 B2 | 1/2016 | Ciurea et al. | |
| 9,253,380 B2 | 2/2016 | Venkataraman et al. | |
| 9,256,974 B1 | 2/2016 | Hines | |
| 9,264,592 B2 | 2/2016 | Rodda et al. | |
| 9,264,610 B2 | 2/2016 | Duparre | |
| 9,361,662 B2 | 6/2016 | Lelescu et al. | |
| 9,374,512 B2 | 6/2016 | Venkataraman et al. | |
| 9,412,206 B2 | 8/2016 | McMahon et al. | |
| 9,413,953 B2 | 8/2016 | Maeda | |
| 9,426,343 B2 | 8/2016 | Rodda et al. | |
| 9,426,361 B2 | 8/2016 | Venkataraman et al. | |
| 9,438,888 B2 | 9/2016 | Venkataraman et al. | |
| 9,445,003 B1* | 9/2016 | Lelescu | H04N 5/23232 |
| 9,456,134 B2 | 9/2016 | Venkataraman et al. | |
| 9,456,196 B2 | 9/2016 | Kim et al. | |
| 9,462,164 B2 | 10/2016 | Venkataraman et al. | |
| 9,485,496 B2 | 11/2016 | Venkataraman et al. | |
| 9,497,370 B2 | 11/2016 | Venkataraman et al. | |
| 9,497,429 B2 | 11/2016 | Mullis et al. | |

(56) References Cited

U.S. PATENT DOCUMENTS

| | | |
|---|---|---|
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,858,673 B2 | 1/2018 | Ciurea et al. |
| 9,864,921 B2 | 1/2018 | Venkataraman et al. |
| 9,888,194 B2 | 2/2018 | Duparre |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,955,070 B2 * | 4/2018 | Lelescu ............. H04N 5/23232 |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino |
| 2002/0015536 A1 | 2/2002 | Warren |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum |
| 2002/0061131 A1 | 5/2002 | Sawhney et al. |
| 2002/0063807 A1 | 5/2002 | Margulis |
| 2002/0075450 A1 | 6/2002 | Aratani |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0122113 A1 | 9/2002 | Foote et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng et al. |
| 2003/0211405 A1 | 11/2003 | Venkataraman |
| 2004/0003409 A1 | 1/2004 | Berstis |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |

(56) References Cited

U.S. PATENT DOCUMENTS

| | | |
|---|---|---|
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296721 A1 | 12/2007 | Chang et al. |
| 2007/0296832 A1 | 12/2007 | Ota et al. |
| 2007/0296835 A1 | 12/2007 | Olsen |
| 2007/0296847 A1 | 12/2007 | Chang et al. |
| 2007/0297696 A1 | 12/2007 | Hamza |
| 2008/0006859 A1 | 1/2008 | Mionetto et al. |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan |
| 2009/0127430 A1 | 5/2009 | Hirasawa et al. |
| 2009/0128644 A1 | 5/2009 | Camp et al. |
| 2009/0128833 A1 | 5/2009 | Yahav |
| 2009/0129667 A1 | 5/2009 | Ho et al. |
| 2009/0140131 A1 | 6/2009 | Utagawa et al. |

(56) References Cited

U.S. PATENT DOCUMENTS

| | | |
|---|---|---|
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167934 A1 | 7/2009 | Gupta |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang et al. |
| 2010/0045809 A1 | 2/2010 | Packard |
| 2010/0053342 A1 | 3/2010 | Hwang et al. |
| 2010/0053347 A1* | 3/2010 | Agarwala ............ H04N 5/23248 348/208.99 |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang et al. |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Gunnewiek et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1* | 8/2010 | Ogawa ............... H04N 5/23248 348/208.4 |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen et al. |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1* | 11/2010 | Tanaka ................. H04N 5/2254 348/280 |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu et al. |
| 2010/0321640 A1 | 12/2010 | Yeh et al. |
| 2010/0329556 A1 | 12/2010 | Mitarai et al. |
| 2010/0329582 A1* | 12/2010 | Albu ..................... G06T 5/003 382/255 |
| 2011/0001037 A1 | 1/2011 | Tewinkle |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1* | 2/2011 | Peleg ................... G06T 3/4038 348/36 |
| 2011/0043613 A1* | 2/2011 | Rohaly ................. G06T 17/00 348/50 |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0115886 A1 | 5/2011 | Nguyen |
| 2011/0121421 A1 | 5/2011 | Charbon |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0222757 A1 | 9/2011 | Yeatman, Jr. et al. |
| 2011/0228142 A1 | 9/2011 | Brueckner |
| 2011/0228144 A1 | 9/2011 | Tian et al. |
| 2011/0234841 A1 | 9/2011 | Akeley et al. |
| 2011/0241234 A1 | 10/2011 | Duparre |

(56) References Cited

U.S. PATENT DOCUMENTS

| | | |
|---|---|---|
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung |
| 2011/0255745 A1 | 10/2011 | Hodder et al. |
| 2011/0261993 A1 | 10/2011 | Weiming et al. |
| 2011/0267264 A1 | 11/2011 | McCarthy et al. |
| 2011/0267348 A1 | 11/2011 | Lin |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim, II et al. |
| 2012/0012748 A1 | 1/2012 | Pain et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian |
| 2012/0069235 A1 | 3/2012 | Imai |
| 2012/0081519 A1 | 4/2012 | Goma |
| 2012/0086803 A1 | 4/2012 | Malzbender et al. |
| 2012/0105590 A1 | 5/2012 | Fukumoto et al. |
| 2012/0105654 A1* | 5/2012 | Kwatra ............. H04N 5/23254 348/208.4 |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0120264 A1* | 5/2012 | Lee ..................... G06T 7/20 348/208.4 |
| 2012/0127275 A1 | 5/2012 | Von Zitzewitz et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon et al. |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307093 A1 | 12/2012 | Miyoshi |
| 2012/0307099 A1 | 12/2012 | Yahata et al. |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1* | 4/2013 | Schmeitz ............. H04N 5/2254 345/419 |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares |
| 2013/0147979 A1 | 6/2013 | McMahon et al. |
| 2013/0176394 A1 | 7/2013 | Tian et al. |
| 2013/0208138 A1 | 8/2013 | Li |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By et al. |
| 2013/0293760 A1 | 11/2013 | Nisenzon et al. |
| 2013/0321589 A1* | 12/2013 | Kirk ..................... G06T 15/04 348/48 |

(56) References Cited

U.S. PATENT DOCUMENTS

| | | |
|---|---|---|
| 2013/0335598 A1 | 12/2013 | Gustaysson |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125771 A1 | 5/2014 | Grossmann et al. |
| 2014/0132810 A1 | 5/2014 | McMahon |
| 2014/0139643 A1 | 5/2014 | Hogasten et al. |
| 2014/0140626 A1* | 5/2014 | Cho ................... G06T 5/003 382/199 |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Lelescu et al. |
| 2015/0199793 A1 | 7/2015 | Venkataraman et al. |
| 2015/0199841 A1 | 7/2015 | Venkataraman et al. |
| 2015/0243480 A1 | 8/2015 | Yamada et al. |
| 2015/0244927 A1 | 8/2015 | Laroia et al. |
| 2015/0248744 A1 | 9/2015 | Hayasaka et al. |
| 2015/0254868 A1 | 9/2015 | Srikanth et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0198096 A1 | 7/2016 | McMahon et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0316140 A1 | 10/2016 | Nayar et al. |
| 2017/0006233 A1 | 1/2017 | Venkataraman et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |

(56) References Cited

U.S. PATENT DOCUMENTS

| | | | |
|---|---|---|---|
| 2018/0035057 | A1 | 2/2018 | McMahon et al. |
| 2018/0040135 | A1 | 2/2018 | Mullis |
| 2018/0048830 | A1 | 2/2018 | Venkataraman et al. |
| 2018/0081090 | A1 | 3/2018 | Duparre et al. |
| 2018/0097993 | A1 | 4/2018 | Nayar et al. |
| 2018/0109782 | A1 | 4/2018 | Duparre et al. |
| 2019/0037116 | A1 | 1/2019 | Molina |
| 2019/0037150 | A1 | 1/2019 | Srikanth et al. |
| 2019/0063905 | A1 | 2/2019 | Venkataraman et al. |

FOREIGN PATENT DOCUMENTS

| | | |
|---|---|---|
| CN | 101010619 A | 8/2007 |
| CN | 101064780 A | 10/2007 |
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 104081414 B | 8/2017 |
| CN | 107230236 A | 10/2017 |
| CN | 107346061 A | 11/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1243945 B1 | 1/2009 |
| EP | 2026563 A1 | 2/2009 |
| EP | 2104334 A1 | 9/2009 |
| EP | 2244484 A1 | 10/2010 |
| EP | 0957642 B1 | 4/2011 |
| EP | 2336816 A2 | 6/2011 |
| EP | 2381418 A1 | 10/2011 |
| EP | 2652678 A1 | 10/2013 |
| EP | 2761534 A1 | 8/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 3066690 A1 | 9/2016 |
| EP | 2652678 B1 | 9/2017 |
| EP | 2817955 B1 | 4/2018 |
| GB | 2482022 A | 1/2012 |
| IN | 2708/CHENP/2014 A1 | 8/2015 |
| JP | 59-025483 | 2/1984 |
| JP | 64-037177 | 2/1989 |
| JP | 02-285772 | 11/1990 |
| JP | 07-015457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008258885 A | 10/2008 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2011523538 A | 8/2011 |
| JP | 2013526801 A | 6/2013 |
| JP | 2014521117 A | 8/2014 |
| JP | 2014535191 A | 12/2014 |
| JP | 2015522178 A | 8/2015 |
| JP | 2015534734 A | 12/2015 |
| JP | 6140709 B2 | 5/2017 |
| JP | 2017163550 A | 9/2017 |
| JP | 2017163587 A | 9/2017 |
| JP | 2017531976 A | 10/2017 |
| KR | 20110097647 A | 8/2011 |
| KR | 20170063827 A | 6/2017 |
| KR | 101824672 B1 | 2/2018 |
| SG | 191151 A1 | 7/2013 |
| TW | 200828994 A | 7/2008 |
| TW | 200939739 A | 9/2009 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2011008443 A2 | 1/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |

(56) References Cited

FOREIGN PATENT DOCUMENTS

| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2016054089 A1 | 4/2016 |

OTHER PUBLICATIONS

International Preliminary Report on Patentability for International Application PCT/US2014/023762, dated Mar. 2, 2015, dated Mar. 9, 2015, 10 Pgs.
International Preliminary Report on Patentability for International Application PCT/US2014/024407, dated Sep. 15, 2015, dated Sep. 24, 2015, 8 Pgs.
International Preliminary Report on Patentability for International Application PCT/US2014/024903, dated Sep. 15, 2015, dated Sep. 24, 2015, 12 Pgs.
International Preliminary Report on Patentability for International Application PCT/US2014/024947, dated Sep. 15, 2015, dated Sep. 24, 2015, 7 Pgs.
International Preliminary Report on Patentability for International Application PCT/US2014/025100, dated Sep. 15, 2015, dated Sep. 24, 2015, 4 Pgs.
International Preliminary Report on Patentability for International Application PCT/US2014/025904, dated Sep. 15, 2015, dated Sep. 24, 2015, 5 Pgs.
International Preliminary Report on Patentability for International Application PCT/US2014/028447, dated Sep. 15, 2015, dated Sep. 24, 2015, 7 Pgs.
International Preliminary Report on Patentability for International Application PCT/US2014/029052, dated Sep. 15, 2015, dated Sep. 24, 2015, 9 Pgs.
International Preliminary Report on Patentability for International Application PCT/US2014/030692, dated Sep. 15, 2015, dated Sep. 24, 2015, 6 Pgs.
International Preliminary Report on Patentability for International Application PCT/US2014/064693, dated May 10, 2016, dated May 19, 2016, 14 Pgs.
International Preliminary Report on Patentability for International Application PCT/US2014/066229, dated May 24, 2016, dated Jun. 2, 2016, 9 Pgs.
International Preliminary Report on Patentability for International Application PCT/US2014/067740, dated May 31, 2016, dated Jun. 9, 2016, 9 Pgs.
International Preliminary Report on Patentability for International Application PCT/US2015/019529, dated Sep. 13, 2016, dated Sep. 22, 2016, 9 Pgs.
International Preliminary Report on Patentability for International Application PCT/US2015/053013, dated Apr. 4, 2017, dated Apr. 13, 2017, 9 Pgs.
International Preliminary Report on Patentability for International Application PCT/US2013/062720, dated Mar. 31, 2015, dated Apr. 9, 2015, 8 pgs.
International Search Report and Written Opinion for International Application No. PCT/US2013/046002, completed Nov. 13, 2013, dated Nov. 29, 2013, 7 pgs.
International Search Report and Written Opinion for International Application No. PCT/US2013/056065, Completed Nov. 25, 2013, dated Nov. 26, 2013, 8 pgs.
International Search Report and Written Opinion for International Application No. PCT/US2013/059991, Completed Feb. 6, 2014, dated Feb. 26, 2014, 8 pgs.
International Search Report and Written Opinion for International Application No. PCT/US2009/044687, completed Jan. 5, 2010, dated Jan. 13, 2010, 9 pgs.
International Search Report and Written Opinion for International Application No. PCT/US2012/056166, completed Nov. 10, 2012, dated Nov. 20, 2012, 9 pgs.
International Search Report and Written Opinion for International Application No. PCT/US2013/024987, completed Mar. 27, 2013, dated Apr. 15, 2013, 14 pgs.
International Search Report and Written Opinion for International Application No. PCT/US2013/027146, completed Apr. 2, 2013, dated Apr. 19, 2013, 11 pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2013/048772, Completed Oct. 21, 2013, dated Nov. 8, 2013, 6 pgs.
International Search Report and Written Opinion for International Application No. PCT/US2013/056502, Completed Feb. 18, 2014, dated Mar. 19, 2014, 7 pgs.
International Search Report and Written Opinion for International Application No. PCT/US2013/069932, Completed Mar. 14, 2014, dated Apr. 14, 2014, 12 pgs.
International Search Report and Written Opinion for International Application No. PCT/US2015/019529, completed May 5, 2015, dated Jun. 8, 2015, 11 Pgs.
International Search Report and Written Opinion for International Application No. PCT/US2015/053013, completed Dec. 1, 2015, dated Dec. 30, 2015, 9 Pgs.
International Search Report and Written Opinion for International Application PCT/US2011/036349, completed Aug. 11, 2011, dated Aug. 22, 2011, 11 pgs.
International Search Report and Written Opinion for International Application PCT/US2014/017766, completed May 28, 2014, dated Jun. 18, 2014, 9 Pgs.
International Search Report and Written Opinion for International Application PCT/US2014/018084, completed May 23, 2014, dated Jun. 10, 2014, 12 Pgs.
International Search Report and Written Opinion for International Application PCT/US2014/018116, completed May 13, 2014, dated Jun. 2, 2014, 12 Pgs.
International Search Report and Written Opinion for International Application PCT/US2014/021439, completed Jun. 5, 2014, dated Jun. 20, 2014, 10 Pgs.
International Search Report and Written Opinion for International Application PCT/US2014/022118, completed Jun. 9, 2014, dated Jun. 25, 2014, 5 pgs.
International Search Report and Written Opinion for International Application PCT/US2014/022774 report completed Jun. 9, 2014, dated Jul. 14, 2014, 6 Pgs.
International Search Report and Written Opinion for International Application PCT/US2014/024407, report completed Jun. 11, 2014, dated Jul. 8, 2014, 9 Pgs.
International Search Report and Written Opinion for International Application PCT/US2014/025100, report completed Jul. 7, 2014, dated Aug. 7, 2014, 5 Pgs.
International Search Report and Written Opinion for International Application PCT/US2014/025904 report completed Jun. 10, 2014, dated Jul. 10, 2014, 6 Pgs.

(56) References Cited

OTHER PUBLICATIONS

International Search Report and Written Opinion for International Application PCT/US2010/057661, completed Mar. 9, 2011, dated Mar. 17, 2011, 14 pgs.
International Search Report and Written Opinion for International Application PCT/US2011/064921, completed Feb. 25, 2011, dated Mar. 6, 2012, 17 pgs.
International Search Report and Written Opinion for International Application PCT/US2012/037670, Completed Jul. 5, 2012, dated Jul. 18, 2012, 9 pgs.
International Search Report and Written Opinion for International Application PCT/US2012/044014, completed Oct. 12, 2012, dated Oct. 26, 2012, 15 pgs.
International Search Report and Written Opinion for International Application PCT/US2012/056151, completed Nov. 14, 2012, dated Nov. 30, 2012, 10 pgs.
International Search Report and Written Opinion for International Application PCT/US2012/058093, completed Nov. 15, 2012, dated Nov. 29, 2012, 12 pgs.
International Search Report and Written Opinion for International Application PCT/US2012/059813, completed Dec. 17, 2012, dated Jan. 7, 2013, 8 pgs.
International Search Report and Written Opinion for International Application PCT/US2014/022123, completed Jun. 9, 2014, dated Jun. 25, 2014, 5 pgs.
International Search Report and Written Opinion for International Application PCT/US2014/023762, Completed May 30, 2014, dated Jul. 3, 2014, 6 Pgs.
International Search Report and Written Opinion for International Application PCT/US2014/024903, completed Jun. 12, 2014, dated Jun. 27, 2014, 13 pgs.
International Search Report and Written Opinion for International Application PCT/US2014/024947, Completed Jul. 8, 2014, dated Aug. 5, 2014, 8 Pgs.
International Search Report and Written Opinion for International Application PCT/US2014/028447, completed Jun. 30, 2014, dated Jul. 21, 2014, 8 Pgs.
International Search Report and Written Opinion for International Application PCT/US2014/029052, completed Jun. 30, 2014, dated Jul. 24, 2014, 10 Pgs.
International Search Report and Written Opinion for International Application PCT/US2014/030692, completed Jul. 28, 2014, dated Aug. 27, 2014, 7 Pgs.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
LensVector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), vol. 1, pp. 61-68, (2006).
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images With Different Focuses Using Support Vector Machines", IEEE Transactions on Neural Networks, vol. 15, No. 6, Nov. 8, 2004, pp. 1555-1561.
Lim, Jongwoo "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Light Field Photography with a Hand-held Plenoptic Camera", Stanford Tech Report CTSR 2005-02, Apr. 20, 2005, pp. 1-11.
Ng et al., "Super-Resolution Image Restoration from Blurred Low-Resolution Images", Journal of Mathematical Imaging and Vision, 2005, vol. 23, pp. 367-378.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "Super-Resolution Image Reconstruction", IEEE Signal Processing Magazine, May 2003, pp. 21-36.

(56) References Cited

OTHER PUBLICATIONS

Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction : A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Extended European Search Report for EP Application No. 11781313.9, Completed Oct. 1, 2013, dated Oct. 8, 2013, 6 pages.
Extended European Search Report for EP Application No. 13810429.4, Completed Jan. 7, 2016, dated Jan. 15, 2016, 6 Pgs.
Extended European Search Report for European Application EP12782935.6, completed Aug. 28, 2014, dated Sep. 4, 2014, 7 Pgs.
Extended European Search Report for European Application EP12804266.0, Report Completed Jan. 27, 2015, dated Feb. 3, 2015, 6 Pgs.
Extended European Search Report for European Application EP12835041.0, Report Completed Jan. 28, 2015, dated Feb. 4, 2015, 7 Pgs.
Extended European Search Report for European Application EP13751714.0, completed Aug. 5, 2015, dated Aug. 18, 2015, 8 Pgs.
Extended European Search Report for European Application EP13810229.8, Report Completed Apr. 14, 2016, dated Apr. 21, 2016, 7 pgs.
Extended European Search Report for European Application No. 13830945.5, Search completed Jun. 28, 2016, dated Jul. 7, 2016, 14 Pgs.
Extended European Search Report for European Application No. 13841613.6, Search completed Jul. 18, 2016, dated Jul. 26, 2016, 8 Pgs.
Extended European Search Report for European Application No. 14763087.5, Search completed Dec. 7, 2016, dated Dec. 19, 2016, 9 pgs.
Extended European Search Report for European Application No. 14860103.2, Search completed Feb. 23, 2017, dated Mar. 3, 2017, 7 Pgs.
Extended European Search Report for European Application No. 14865463.5, Search completed May 30, 2017, dated Jun. 8, 2017, 6 Pgs.
Extended European Search Report for European Application No. 15847754.7, Search completed Jan. 25, 2018, dated Feb. 9, 2018, 8 Pgs.
Supplementary European Search Report for EP Application No. 13831768.0, Search completed May 18, 2016, dated May 30, 2016, 13 Pgs.
International Preliminary Report on Patentability for International Application No. PCT/US2012/056151, Report dated Mar. 25, 2014, 9 pgs.
International Preliminary Report on Patentability for International Application No. PCT/US2012/056166, dated Mar. 25, 2014, dated Apr. 3, 2014 8 pgs.
International Preliminary Report on Patentability for International Application No. PCT/US2012/058093, dated Sep. 18, 2013, dated Oct. 22, 2013, 40 pgs.
International Preliminary Report on Patentability for International Application No. PCT/US2012/059813, Search Completed Apr. 15, 2014, 7 pgs.
International Preliminary Report on Patentability for International Application No. PCT/US2013/059991, dated Mar. 17, 2015, dated Mar. 26, 2015, 8 pgs.
International Preliminary Report on Patentability for International Application PCT/US2010/057661, dated May 22, 2012, dated May 31, 2012, 10 pages.
International Preliminary Report on Patentability for International Application PCT/US2011/036349, dated Nov. 13, 2012, dated Nov. 22, 2012, 9 pages.
International Preliminary Report on Patentability for International Application PCT/US2013/056065, dated Feb. 24, 2015, dated Mar. 5, 2015, 4 Pgs.
International Preliminary Report on Patentability for International Application PCT/US2013/062720, Report dated Mar. 31, 2015, dated Apr. 9, 2015, 8 Pgs.
International Preliminary Report on Patentability for International Application PCT/US2011/064921, dated Jun. 18, 2013, dated Jun. 27, 2013, 14 pgs.
International Preliminary Report on Patentability for International Application PCT/US2013/024987, dated Aug. 12, 2014, 13 Pgs.
International Preliminary Report on Patentability for International Application PCT/US2013/027146, completed Aug. 26, 2014, dated Sep. 4, 2014, 10 Pgs.
International Preliminary Report on Patentability for International Application PCT/US2013/039155, completed Nov. 4, 2014, dated Nov. 13, 2014, 10 Pgs.
International Preliminary Report on Patentability for International Application PCT/US2013/046002, dated Dec. 31, 2014, dated Jan. 8, 2015, 6 Pgs.

(56) References Cited

OTHER PUBLICATIONS

International Preliminary Report on Patentability for International Application PCT/US2013/048772, dated Dec. 31, 2014, dated Jan. 8, 2015, 8 Pgs.
International Preliminary Report on Patentability for International Application PCT/US2013/056502, dated Feb. 24, 2015, dated Mar. 5, 2015, 7 Pgs.
International Preliminary Report on Patentability for International Application PCT/US2013/069932, dated May 19, 2015, dated May 28, 2015, 12 Pgs.
International Preliminary Report on Patentability for International Application PCT/US2014/017766, dated Aug. 25, 2015, dated Sep. 3, 2015, 8 Pgs.
International Preliminary Report on Patentability for International Application PCT/US2014/018084, dated Aug. 25, 2015, dated Sep. 3, 2015, 11 Pgs.
International Preliminary Report on Patentability for International Application PCT/US2014/018116, dated Sep. 15, 2015, dated Sep. 24, 2015, 12 Pgs.
International Preliminary Report on Patentability for International Application PCT/US2014/021439, dated Sep. 15, 2015, dated Sep. 24, 2015, 9 Pgs.
International Preliminary Report on Patentability for International Application PCT/US2014/022118, dated Sep. 8, 2015, dated Sep. 17, 2015, 4 pgs.
International Preliminary Report on Patentability for International Application PCT/US2014/022123, dated Sep. 8, 2015, dated Sep. 17, 2015, 4 Pgs.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, Apr. 6, 2006, vol. 1, pp. R1-R16.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, Apr. 21, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Eng et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 10, 2012) from URL:<http://www.site.uottawa.ca/-edubois/theses/Fanaswala_thesis.pdf>, 2009, 163 pgs.

Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Gastal et al., "Shared Sampling for Real-Time Alpha Matting", Computer Graphics Forum, Eurographics 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Goldman et al., "Video Object Annotation, Navigation, and Composition", In Proceedings of UIST 2008, Oct. 19-22, 2008, Monterey CA, USA, pp. 3-12.
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, Or, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.

(56) References Cited

OTHER PUBLICATIONS

Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horisaki et al., "Superposition Imaging for Three-Dimensionally Space-Invariant Point Spread Functions", Applied Physics Express, Oct. 13, 2011, vol. 4, pp. 112501-1-112501-3.
Horn et al., "LightShop: Interactive Light Field Manipulation and Rendering", In Proceedings of 13D, Jan. 1, 2007, pp. 121-128.
Isaksen et al., "Dynamically Reparameterized Light Fields", In Proceedings of SIGGRAPH 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Neel S. "Color Calibration for Arrays of Inexpensive Image Sensors", Master's with Distinction in Research Report, Stanford University, Department of Computer Science, Mar. 2004, 30 pgs.
Joshi et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:I/ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pgs.
Kitamura et al., "Reconstruction of a high-resolution image on a compound-eye image-capturing system", Applied Optics, Mar. 10, 2004, vol. 43, No. 8, pp. 1719-1727.
Konolige, Kurt "Projected Texture Stereo", 2010 IEEE International Conference on Robotics and Automation, May 3-7, 2010, pp. 148-155.
Lee et al., "Automatic Upright Adjustment of Photographs", IEEE Conference on Computer Vision and Pattern Recognition (CVPR), 2012, pp. 877-884.
Seitz et al., "Plenoptic Image Editing", International Journal of Computer Vision 48, Conference Date Jan. 7, 1998, 29 pgs., DOI: 10.1109/ICCV.1998.710696 • Source: DBLP Conference: Computer Vision, Sixth International Conference.
Shotton et al., "Real-time human pose recognition in parts from single depth images", CVPR 2011, Jun. 20-25, 2011, Colorado Springs, CO, USA, pp. 1297-1304.
Shum et al., "A Review of Image-based Rendering Techniques", Visual Communications and Image Processing 2000, May 2000, 12 pgs.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park—Observational Astronomy (ASTR 310), Oct. 19, 2006, pp. 1-5 (online], [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS

(56) References Cited

OTHER PUBLICATIONS

Technology", Proceedings of the World Congress on Engineering and Computer Science 2008, WCECS 2008, Oct. 22-24, 2008.
Wang, "Calculation Image Position, Size and Orientation Using First Order Properties", Dec. 29, 2010, OPTI521 Tutorial, 10 pgs.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pages, published Aug. 5, 2007.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, pp. 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "A Real-Time Distributed Light Field Camera", Eurographics Workshop on Rendering (2002), published Jul. 26, 2002, pp. 1-10.
Yang et al., "Superresolution Using Preconditioned Conjugate Gradient Method", Proceedings of SPIE—The International Society for Optical Engineering, Jul. 2002, 8 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
International Search Report and Written Opinion for International Application PCT/US2014/064693, Completed Mar. 7, 2015, dated Apr. 2, 2015, 15 pgs.
International Search Report and Written Opinion for International Application PCT/US2014/066229, Completed Mar. 6, 2015, dated Mar. 19, 2015, 9 Pgs.
International Search Report and Written Opinion for International Application PCT/US2014/067740, Completed Jan. 29, 2015, dated Mar. 3, 2015, 10 pgs.
Office Action for U.S. Appl. No. 12/952,106, dated Aug. 16, 2012, 12 pgs.
"Exchangeable image file format for digital still cameras: Exif Version 2.2", Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", 2007 IEEE Transactions on Image Processing, vol. 16, No. 5, May 2007, published Apr. 16, 2007, pp. 1185-1194.
Bennett et al., "Multispectral Video Fusion", Computer Graphics (ACM SIGGRAPH Proceedings), Jul. 25, 2006, published Jul. 30, 2006, 1 pg.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Borman, "Topics in Multiframe Superresolution Restoration", Thesis of Sean Borman, Apr. 2004, 282 pgs.
Borman et al, "Image Sequence Processing", Dekker Encyclopedia of Optical Engineering, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc. SPIE, published Jul. 1, 2003, vol. 5016, 12 pgs.
Borman et al., "Linear models for multi-frame super-resolution restoration under non-affine registration and spatially varying PSF", Proc. SPIE, May 21, 2004, vol. 5299, 12 pgs.

(56) References Cited

OTHER PUBLICATIONS

Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bruckner et al., "Thin wafer-level camera lenses inspired by insect compound eyes", Optics Express, Nov. 22, 2010, vol. 18, No. 24, pp. 24379-24394.
Bryan et al., "Perspective Distortion from Interpersonal Distance is an Implicit Visual Cue for Social Judgments of Faces", PLOS One, vol. 7, Issue 9, Sep. 26, 2012, e45301, doi:10.1371/journal.pone.0045301, 9 pgs.
Capel, "Image Mosaicing and Super-resolution", Retrieved on Nov. 10, 2012, Retrieved from the Internet at URL<http://citeseerx.ist.psu.edu/viewdoc/download?doi=1 0.1.1.226.2643&rep=rep1 &type=pdf>, 2001, 269 pgs.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Investigation of Computational Compound-Eye Imaging System with Super-Resolution Reconstruction", IEEE, ISASSP, Jun. 19, 2006, pp. 1177-1180.
Chan et al., "Super-resolution reconstruction in a computational compound-eye imaging system", Multidim Syst Sign Process, published online Feb. 23, 2007, vol. 18, pp. 83-101.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Interactive deformation of light fields", In Proceedings of SIGGRAPH I3D, Apr. 3, 2005, pp. 139-146.
Chen et al., "KNN matting", 2012 IEEE Conference on Computer Vision and Pattern Recognition, Jun. 16-21, 2012, Providence, RI, USA, pp. 869-876.
Chen et al., "KNN Matting", IEEE Transactions on Pattern Analysis and Machine Intelligence, Sep. 2013, vol. 35, No. 9, pp. 2175-2188.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., "Immersive Visual Communication", IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drouin et al., "Improving Border Localization of Multi-Baseline Stereo Using Border-Cut", International Journal of Computer Vision, Jul. 5, 2006, vol. 83, Issue 3, 8 pgs.
Drulea et al., "Motion Estimation Using the Correlation Transform", IEEE Transactions on Image Processing, Aug. 2013, vol. 22, No. 8, pp. 3260-3270, first published May 14, 2013.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, Nov. 21, 2008, vol. 3, pp. 1-6.

\* cited by examiner

SYSTEMS AND METHODS FOR SYNTHESIZING HIGH RESOLUTION IMAGES USING IMAGE DECONVOLUTION BASED ON MOTION AND DEPTH INFORMATION

CROSS-REFERENCE TO RELATED APPLICATIONS

The current application is a continuation of U.S. patent application Ser. No. 15/258,947, entitled "Systems and Methods for Synthesizing High Resolution Images Using Image Deconvolution Based on Motion and Depth Information" to Lelescu et al., filed Sep. 7, 2016, which is a continuation of U.S. patent application Ser. No. 14/200,629, filed Mar. 7, 2014, which application claims priority to U.S. Provisional Patent Application Ser. No. 61/788,078, filed Mar. 15, 2013, the disclosures of which are hereby incorporated by reference in their entirety.

FIELD OF THE INVENTION

The present invention relates to systems and methods for image deconvolution and more specifically to synthesizing high resolution images using image deconvolution processes.

BACKGROUND

Imaging devices, such as cameras, can be used to capture images of portions of the electromagnetic spectrum, such as the visible light spectrum, incident upon an image sensor. For ease of discussion, the term light is generically used to cover radiation across the entire electromagnetic spectrum. In a typical imaging device, light enters through an opening (aperture) at one end of the imaging device and is directed to an image sensor by one or more optical elements such as lenses. The image sensor includes pixels or sensor elements that generate signals upon receiving light via the optical element. Commonly used image sensors include charge-coupled device (CCDs) sensors and complementary metal-oxide semiconductor (CMOS) sensors. Each pixel in an image sensor is capable of capturing light and converting the captured light into electrical signals. In order to separate the colors of light and capture a color image, a Bayer filter is often placed over the image sensor, filtering the incoming light into its red, blue, and green (RGB) components that are then captured by the image sensor. The RGB signal captured by the image sensor using a Bayer filter can then be processed and a color image can be created.

SUMMARY OF THE INVENTION

Systems and methods for synthesizing high resolution images using image deconvolution and depth information in accordance embodiments of the invention are disclosed. In one embodiment, an array camera includes a processor and a memory connected to the processor and configured to store an image deconvolution application, wherein the image deconvolution application configures the processor to obtain light field image data, where the light field image data includes a synthesized high resolution image having a plurality of pixels, a depth map, and metadata describing the motion associated with a capturing device that captured the light field image data, determine motion data based on the metadata contained in the light field image data, generate a depth-dependent point spread function based on the synthesized high resolution image, the depth map, and the motion data, where the depth-dependent point spread function describes the blurriness of points within the synthesized high resolution image based on the motion of the capturing device and the depth of the pixels described in the depth map, measure the quality of the synthesized high resolution image based on the generated depth-dependent point spread function, when the measured quality of the synthesized high resolution image is within a quality threshold, incorporate the synthesized high resolution image into the light field image data, and when the measured quality of the synthesized high resolution image is outside the quality threshold, determine updated motion data based on the measured quality and the depth-dependent point spread function, generate an updated depth-dependent point spread function based on the updated motion data, and synthesize a new high resolution image based on the updated depth-dependent point spread function.

In an additional embodiment of the invention, the array camera further includes an array camera module including an imager array having multiple focal planes and an optics array configured to form images through separate apertures on each of the focal planes, wherein the array camera module is configured to communicate with the processor, and wherein the obtained light field image data includes image data captured by the imager array.

DETAILED DESCRIPTION

Figure 1:
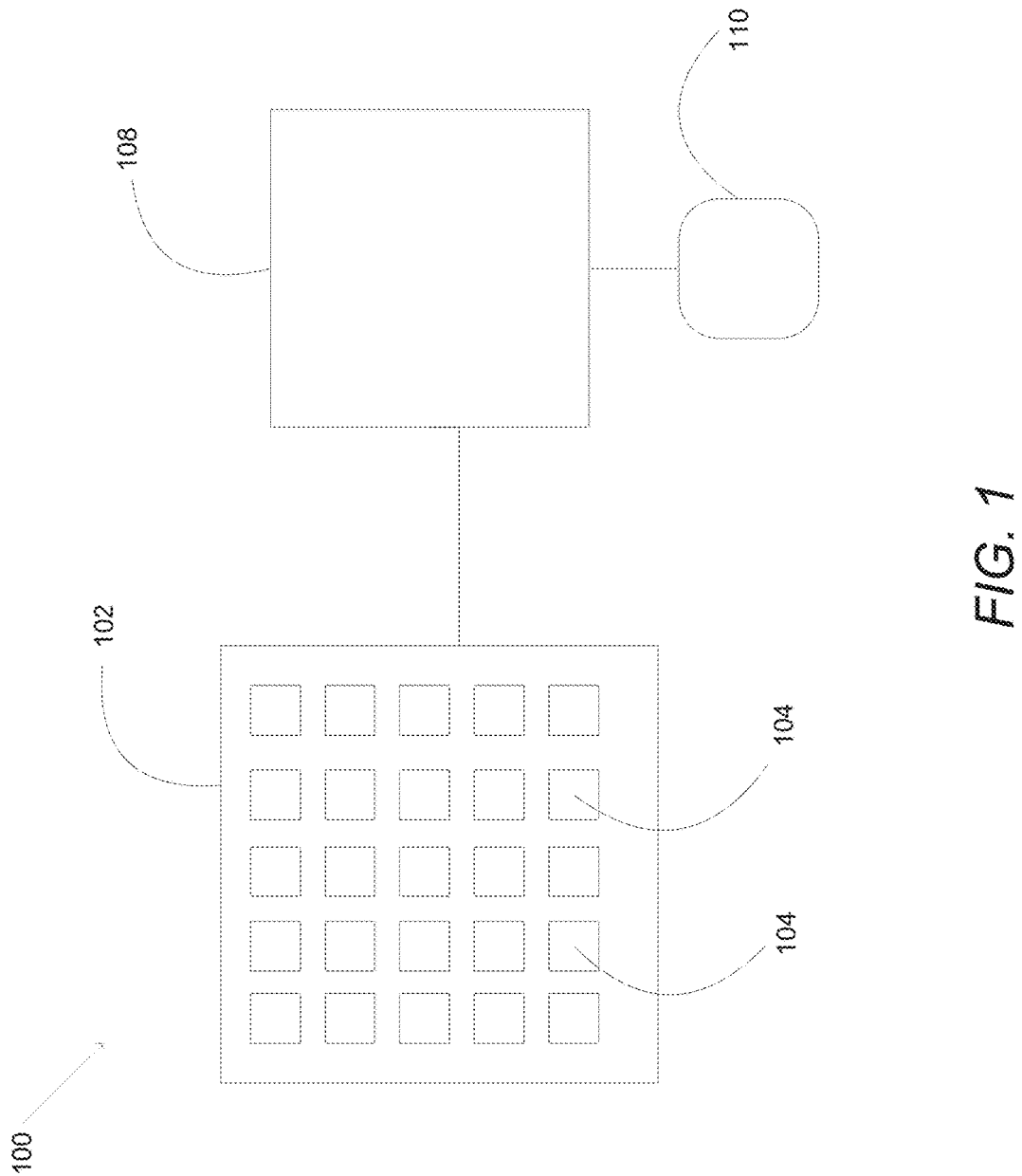
FIG. 1 is a system diagram of an array camera including a 5×5 imager array with storage hardware connected with a processor in accordance with an embodiment of the invention.

Turning now to the drawings, systems and methods for performing image deconvolution processes utilizing depth information in accordance with embodiments of the invention are illustrated. Array cameras, such as those described in U.S. patent application Ser. No. 12/935,504, entitled "Capturing and Processing of Images using Monolithic Camera Array with Heterogeneous Imagers" to Venkataraman et al., can be utilized to capture light fields and store the captured light fields. In a variety of embodiments, a light field is captured by obtaining image data forming a two dimensional array of image data of a scene captured from multiple viewpoints. In accordance with many embodiments of the invention, images, including high resolution images, may be synthesized from image data captured by an appropriately configured array camera using a super-resolution process. Systems and methods for performing super-resolution processing on image data captured by an array camera in accordance with embodiments of the invention are disclosed in U.S. patent application Ser. No. 12/967,807 entitled "System and Methods for Synthesizing High Resolution Images Using Super-Resolution Processes" to Lelescu et al. In many instances, the process of synthesizing a high resolution image may result in a single image, a stereoscopic pair of images that can be used to display three dimensional (3D) information via an appropriate 3D display, and/or a variety of images from different viewpoints. The process of synthesizing high resolution images from lower resolution image data captured by an imager array in an array camera typically involves performing parallax detection and correction to reduce disparity between the images captured by each of the cameras in the array camera module. Processes for parallax detection and correction in accordance with embodiments of the invention are disclosed in U.S. patent application Ser. No. 13/972,881 entitled "Systems and Methods for Parallax Detection and Correction in Images Captured Using Array Cameras that Contain Occlusions using Subsets of Images to Perform Depth Estimation" to Venkataraman et al. In many embodiments, processes for performing parallax detection and correction yield depth information. Therefore, processes for synthesizing high resolution images using lower resolution image data using super-resolution processes can also involve the generation of a depth map describing the depth information. The term depth map refers to metadata that describes the distance from the camera to the portion of the scene captured in the pixels (or a subset of the pixels) of an image.

Image data captured using a camera are often blurry due to the quality of the sensor, movement of the camera, hand jitter, and/or other factors affecting the quality of the captured image data. The flaws in blurry images can be further exacerbated when the blurry images are used to synthesize images using super-resolution processes, resulting in images containing flaws influencing the blurriness and quality of the synthesized image. In particular, the flaws in the captured image data affect the quality of the synthesized image depend based in part on the depth of the flaws within the synthesized image. Note that, in a variety of embodiments, the synthesized image need not be synthesized using super-resolution processes; rather any image synthesized from image data containing depth information can be affected by flaws in the captured light field due to the motion of the capturing device during the capture.

Image deconvolution devices (such as array cameras configured to via software to perform image deconvolution processes) in accordance with embodiments of the invention are configured to perform image deconvolution processes on synthesized images to improve the quality of the synthesized image by compensating for the motion of the device during the capturing of a light field from multiple viewpoints from which the image is synthesized. Image deconvolution devices are configured to perform image deconvolution processes by generating a depth-dependent (and/or motion dependent) point spread function (PSF) based on the motion of the array camera capturing the image data utilized in the synthesis of the image being deconvoluted and the depth information determined in the performance of parallax detection and correction in synthesizing the image. A depth-dependent PSF describes the sharpness and/or blurriness of points within a synthesized image based on the motion of the capturing device and the depth of the points. PSFs utilize blur kernels to describe the blur for the points within the synthesized image. A blur kernel is a function describing the sharpness (and/or blur) of the area surrounding a point within a synthesized image. The motion of the array camera can be determined using a blind motion estimation process, an ego-motion estimation of the array camera motion, and/or the motion of the array camera as measured by the array camera. Although the processes described herein are in reference to performing image deconvolution processes on entire images, it should be noted that the processes described herein can be performed on tiles or patches of images in accordance with embodiments of the invention.

The disclosures of each of U.S. patent application Ser. Nos. 12/935,504, 12/967,807, and 13/972,881 are hereby incorporated by reference in their entirety. Although the systems and methods described are with respect to array cameras configured to both capture and process captured light fields, devices (including image deconvolution devices that are not configured to capture light fields) that are configured to obtain captured light fields captured using a different device and process the received data can be utilized in accordance with the requirements of a variety of embodiments of the invention. Additionally, any of the various systems and processes described herein can be performed in sequence, in alternative sequences, and/or in parallel (e.g. on different computing devices) in order to achieve similar results in a manner that is more appropriate to the requirements of a specific application of the invention. Systems and methods for performing image deconvolution processes on synthesized images in accordance with embodiments of the invention are described below.

Array Camera Architectures

Array cameras in accordance with many embodiments of the invention include sensors such as, but not limited to, an inertial movement sensor system or inertial measurement unit, configured to measure the motion of the array camera at the time a light field is captured. An array camera including an imager array in accordance with an embodiment of the invention is illustrated in FIG. 1. The array camera 100 includes an array camera module including an imager array 102 having multiple focal planes 104 and an optics array configured to form images through separate apertures on each of the focal planes. The imager array 102 is configured to communicate with a processor 108. In accordance with many embodiments of the invention, the processor 108 is configured to read out image data captured by the imager array 102 and synthesize images using super-resolution processes. Imager arrays including multiple focal planes are discussed in U.S. patent application Ser. No. 13/106,797, entitled "Architectures for System on Chip Array Cameras" to McMahon et al., the entirety of which is hereby incorporated by reference.

In the illustrated embodiment, the focal planes are configured in a 5×5 array. In other embodiments, any of a variety of array configurations can be utilized including linear arrays and subsets of the array. Each focal plane 104 of the imager array is capable of capturing image data from an image of the scene formed through a distinct aperture. Typically, each focal plane includes a plurality of rows of pixels that also forms a plurality of columns of pixels, and each focal plane is contained within a region of the imager that does not contain pixels from another focal plane. The pixels or sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light (e.g. any electromagnetic signal) incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element. In a variety of embodiments, a Bayer filter pattern of light filters can be applied to one or more of the focal planes 104. Similarly, the sensor elements can be configured to capture information from non-visible light sources, such as infrared as appropriate to the specific requirements of embodiments of the invention.

In a variety of embodiments, the processor 108 is connected to an inertial movement sensor system 110 that is configured to capture motion information related to the rotation and/or translation of the array camera. A variety of inertial measurement sensors can be utilized in accordance with a number of embodiments of the invention including, but not limited to, gyroscopes and microelectromechanical system (MEMS) accelerometers. In several embodiments, the inertial movement sensor system 110 is configured to measure the rotation and/or translation of the imager array 102. In many embodiments, measuring the rotation and/or translation of the imager array 102 involves measuring the rotation and/or translation of the focal planes 104. In a number of embodiments, the inertial movement sensor 110 is integrated into or connected to the imager array 102 and the processor 108 is configured to receive the rotation and/or translation information from the imager array 102. In order to calibrate the inertial movement sensor system 110 to the imager array 102 (and/or focal planes 104), an a priori rigid motion transformation is determined that calibrates the motion data determined using the inertial movement sensor 110 to the movement of the imager array 102. Processes for determining an a priori rigid motion transformation in accordance with embodiments of the invention are discussed below.

In several embodiments, information captured by one or more focal planes 104 is read out of the imager array 102 as packets of image data. In several embodiments, a packet of image data contains one or more pixels from a row of pixels captured from each of one or more of the focal planes 104. Packets of image data may contain other groupings of captured pixels, such as one or more pixels captured from a column of pixels in each of one or more focal planes and/or a random sampling of pixels. Systems and methods for reading out image data from array cameras that can be utilized in array cameras configured in accordance with embodiments of the invention are described in U.S. Pat. No. 8,305,456 entitled "Systems and Methods for Transmitting and Receiving Array Camera Image Data" to McMahon, the disclosure of which is incorporated by reference herein in its entirety.

In a number of embodiments, the captured packets of image data are associated with an image packet timestamp. In many embodiments, inertial movement data captured using the inertial movement sensor system 110 is associated with an inertial movement measurement timestamp. In several embodiments, the processor 108 associates one or more packets of image data with inertial movement measurement data based upon the image packet timestamp(s) and the inertial movement measurement timestamp. In several embodiments, there is a delay in the capture between the first pixel captured by the focal plane 104 and the last pixel captured. As is discussed further below, image deconvolution processes in accordance with embodiments of the invention utilize the timestamps associated with the image data and the inertial measurement data to accommodate variations in motion during the period in time in which image data utilized in synthesizing a high resolution image is captured.

Array cameras are configured to create a light field image data file containing a synthesized high resolution image and metadata generated using the captured light field image data. One such file format is the JPEG-DX extension to ISO/IEC 10918-1 described in U.S. patent application Ser. No. 13/631,731, titled "Systems and Methods for Encoding Light Field Image Files" to Venkataraman et al, the entirety of which is hereby incorporated by reference. The metadata can include a variety of data captured and/or generated by the array camera, including, but not limited to, the generated depth information, the timestamp information, and/or motion data describing the motion of the array camera during the capture of the image data.

Although a specific array camera utilized in array camera configured to perform image deconvolution processes is illustrated in FIG. 1, alternative architectures can also be utilized as appropriate to the requirements of specific applications in accordance with embodiments of the invention. Systems and methods for synthesizing high resolution images using image deconvolution processes in accordance with embodiments of the invention are discussed below.

Image Deconvolution Devices

Figure 2:
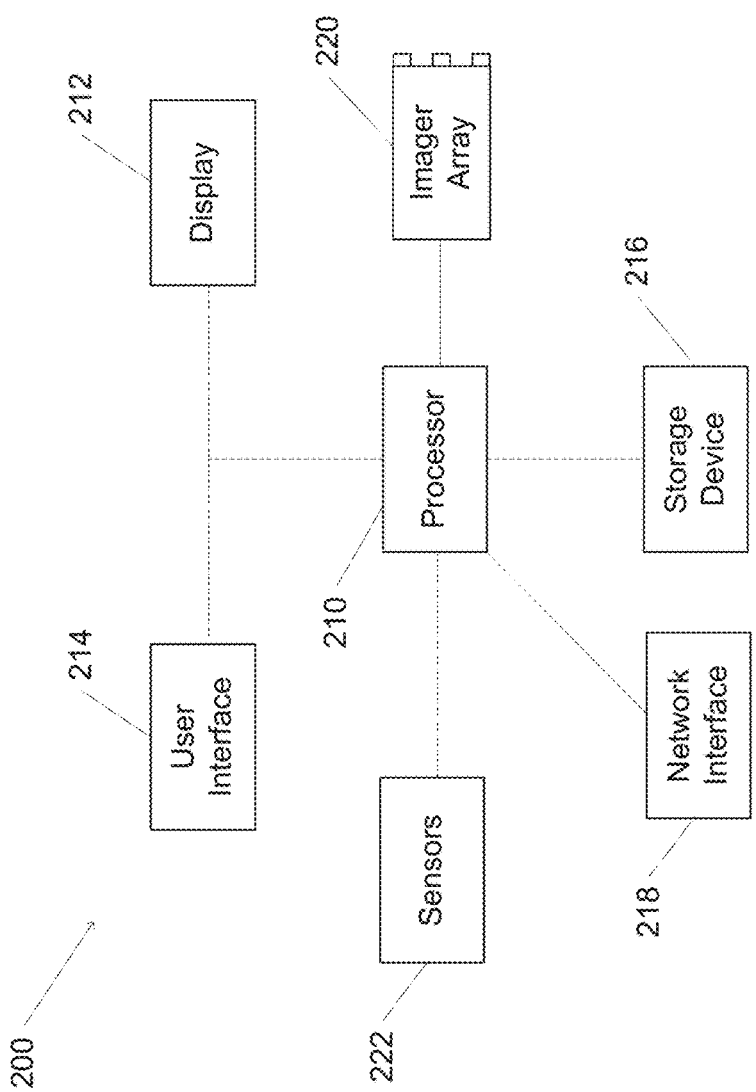
FIG. 2 is a functional block diagram of an image deconvolution device configured to perform image deconvolution processes on synthesized images in accordance with an embodiment of the invention.

A variety of devices can be configured to synthesize high resolution images using captured light fields and image deconvolution processes, including array cameras and other devices that are not capable of capturing image data using an imager array. A diagram of an image deconvolution device in accordance with an embodiment of the invention is illustrated in FIG. 2. The image deconvolution device 200 contains a processor 210 capable of being configured via software (e.g. an image deconvolution application) to load and manipulate light field image data files. In many embodiments of the invention, the processor 210 is connected to an imager array 220 capable of capturing light fields. In a variety of embodiments, the imager array 220 is configured to capture light field image data utilizing processes similar to those described above.

In many embodiments, the processor 210 is connected to a display 212 capable of displaying two dimensional images synthesized using a captured light field. In several embodiments, the display 212 is capable of displaying three dimensional images. In a number of embodiments, the processor 210 is connected to a user interface 214, such as a touchscreen interface, a pointing device, and/or a keyboard. In many embodiments, the user interface 214 can be a camera or array camera capable of tracking user movements. In several embodiments, the processor 210 is connected to a storage device 216. The storage device 216 is capable of storing light field image data files and synthesized images and delivering the stored data to the processor 210 for manipulation. In a number of embodiments, the processor 210 is connected to a network interface 218 capable of communication via a network. The network communication involves receiving and transmitting light field image data files and/or synthesized images, where the light field image data files and/or synthesized images can be stored in storage device 216 (if present) or can be loaded directly into the processor 210.

In several embodiments, the processor 210 is configured to synthesize images using image data captured using the imager array utilizing super-resolution processes as described above. The processor 210 can perform image deconvolution processes on the synthesized images (or any other images including depth information) using a depth-dependent point spread function (PSF) determined using motion and depth information. The processor 210 can determine the motion information using a variety of processes, including, but not limited to, blind motion estimation, ego-motion estimation, or using measured motion information contained in metadata in the light field image data files. Processes for determining depth-dependent point spread functions and measuring the motion of an array camera are described in detail below. In a number of embodiments, input received from the user interface 214 can be utilized in the image deconvolution process.

Although a specific example of an array camera configured to perform image deconvolution processes is described above with respect to FIG. 2, any device capable performing image deconvolution processes on images having depth information can be used in accordance with embodiments of the invention. Processes for image deconvolution of synthesized images in accordance with embodiments of the invention are discussed below.

Blind Image Deconvolution

Figure 3:
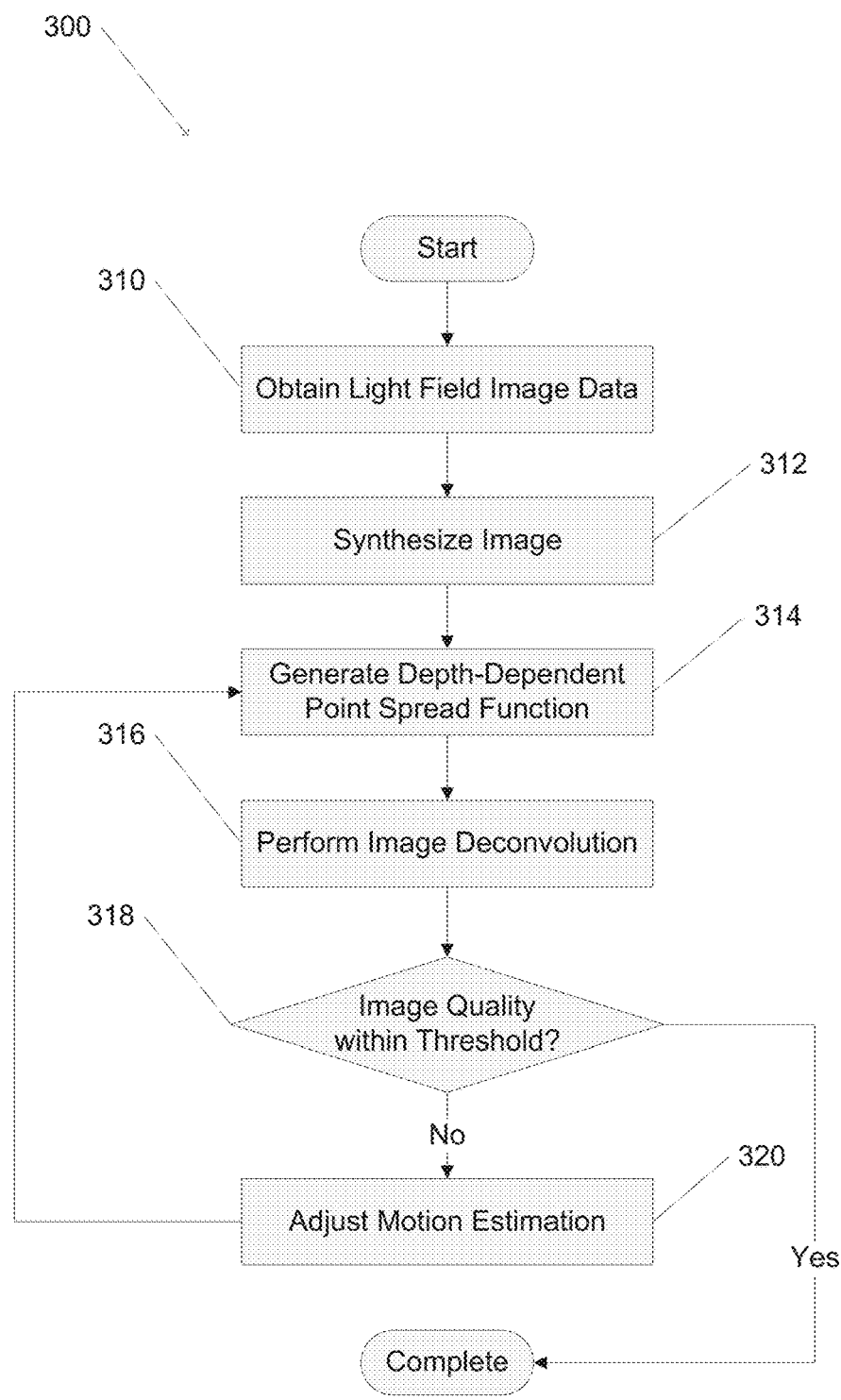
FIG. 3 is a flow chart illustrating a process for blind image deconvolution of a synthesized image using depth information in accordance with an embodiment of the invention.

In order to create a sharp image, image deconvolution devices are configured to perform image deconvolution processes on images having depth information. However, many images do not have information regarding the motion of the capturing device. Image deconvolution devices in accordance with embodiments of the invention are configured to perform a blind estimation of the motion of the capturing device utilized in the image deconvolution process. A process for performing blind image deconvolution in accordance with an embodiment of the invention is illustrated in FIG. 3. The process 300 includes obtaining (310) light field image data. An image is synthesized (312). A depth-dependent point spread function is generated (314) and image deconvolution is performed (316) on the synthesized image. If the quality of the synthesized image is within (318) a threshold value, the process completes. If the quality of the synthesized image is not within (318) the threshold, the motion estimation is adjusted (320) and a new depth-dependent point spread function is generated (314).

In a variety of embodiments, the light field image data is obtained (310) directly from an array camera utilizing processes similar to those described above. In a number of embodiments, the light field image data is obtained (310) from a light field image data file. In several embodiments, the synthesized (312) image is contained in the light field image data. In many embodiments, an image is synthesized (312) using the light field image data. The synthesized (312) image contains metadata, where the metadata includes a depth map describing depth information related to the points within the synthesized image. A depth-dependent PSF is generated (314) using the depth map and a motion estimation. Processes for generating depth-dependent PSF in accordance with embodiments of the invention are discussed below. The camera motion estimation can be any predefined value (including no motion at all) as appropriate to the requirements of a specific application in accordance with embodiments of the invention. Image deconvolution is performed (316) using the depth-dependent PSF and the quality of the resulting image is analyzed. If the quality of the image is within (318) a quality threshold, the image is considered of sufficient quality and the process 300 completes. The quality threshold can be dependent on any visual properties of the image as appropriate to the requirements of a specific application in accordance with embodiments of the invention, including the sharpness of the image. The quality threshold can be pre-determined and/or determined dynamically. If the image quality is not within the threshold (318), the motion estimation is adjusted (320). A number of processes can be utilized to adjust (320) the motion estimation, such as gradient ascent, gradient descent, or any other iterative optimization technique as appropriate to the requirements of a specific application in accordance with embodiments of the invention.

Although a specific process for performing blind image deconvolution of synthesized images having depth information in accordance with an embodiment of the invention is described above with respect to FIG. 3, processes appropriate to the requirements of specific applications can be utilized in accordance with embodiments of the invention. Processes for performing image deconvolution using estimated and/or measured camera motion in accordance with embodiments of the invention are discussed below.

Image Deconvolution with Estimated Motion Information

Figure 4:
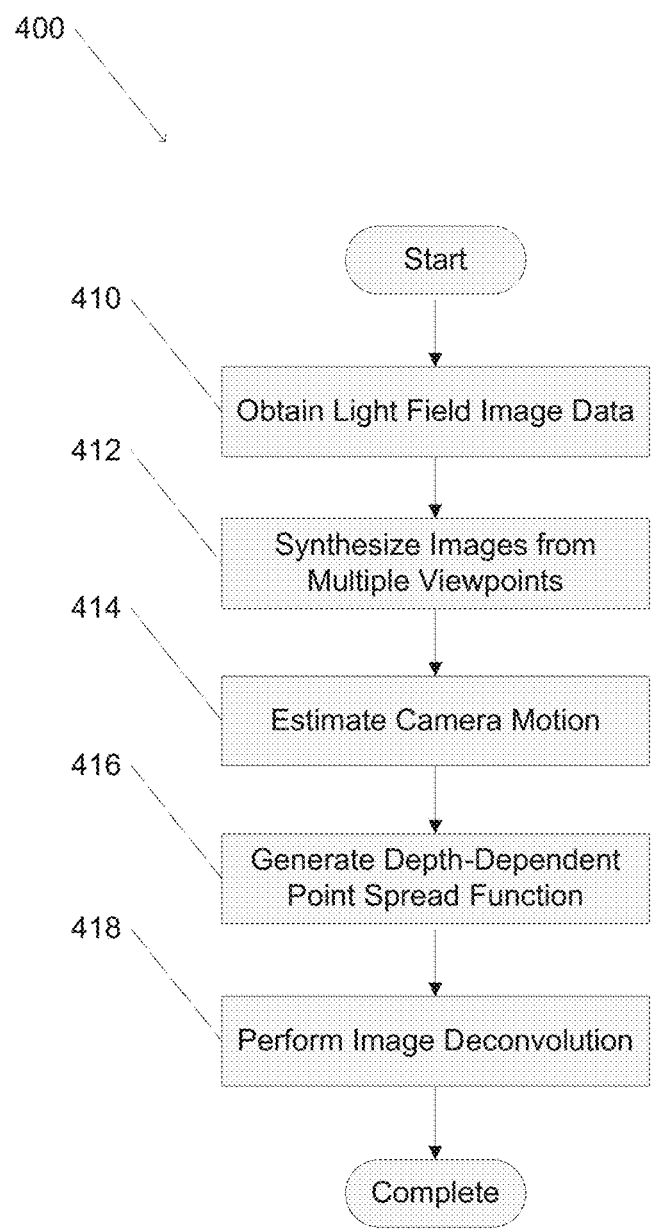
FIG. 4 is a flow chart illustrating a process for image deconvolution of a synthesized image using estimated camera motion in accordance with an embodiment of the invention.

A variety of image deconvolution devices are configured to estimate the motion of the camera capturing the image being deconvoluted. A process for performing image deconvolution using estimated motion information in accordance with an embodiment of the invention is illustrated in FIG. 4. The process 400 includes obtaining (410) light field image data. Images from multiple viewpoints are synthesized (412). Camera motion is estimated (414), a depth-dependent point spread function is generated (416), and image deconvolution is performed (418).

In several embodiments, obtaining (410) light field image data using processes similar to those described above. Synthesizing (412) images from multiple viewpoints includes performing a number of super-resolution processes using the light field image data and the associated depth map to create multiple views of the same scene. Estimating (414) camera motion is performed using ego-motion techniques in accordance with embodiments of the invention. Ego-motion techniques estimate camera motion by detecting features in a first image and matching those features to a second image. This matching process is performed using pairs of the synthesized (412) images. Based on the matching of the features, an optical flow field is generated; the optical flow field describes the estimate of the motion of the camera. Other techniques for estimating (414) camera motion can be utilized as appropriate to the requirements of a specific application in accordance with embodiments of the invention. The depth-dependent point spread function is generated (416) using the estimated camera motion and the depth map. Image deconvolution is performed (418) using processes similar to those described above.

A specific process for performing image deconvolution using estimated camera motion in accordance with an embodiment of the invention is described above with respect to FIG. 4; however, a variety of processes can be utilized in accordance with embodiments of the invention. Processes for performing image deblurring using depth information, determining the motion of array cameras, and generating point spread functions are described below.

Image Deconvolution with Measured Motion Information

Figure 5:
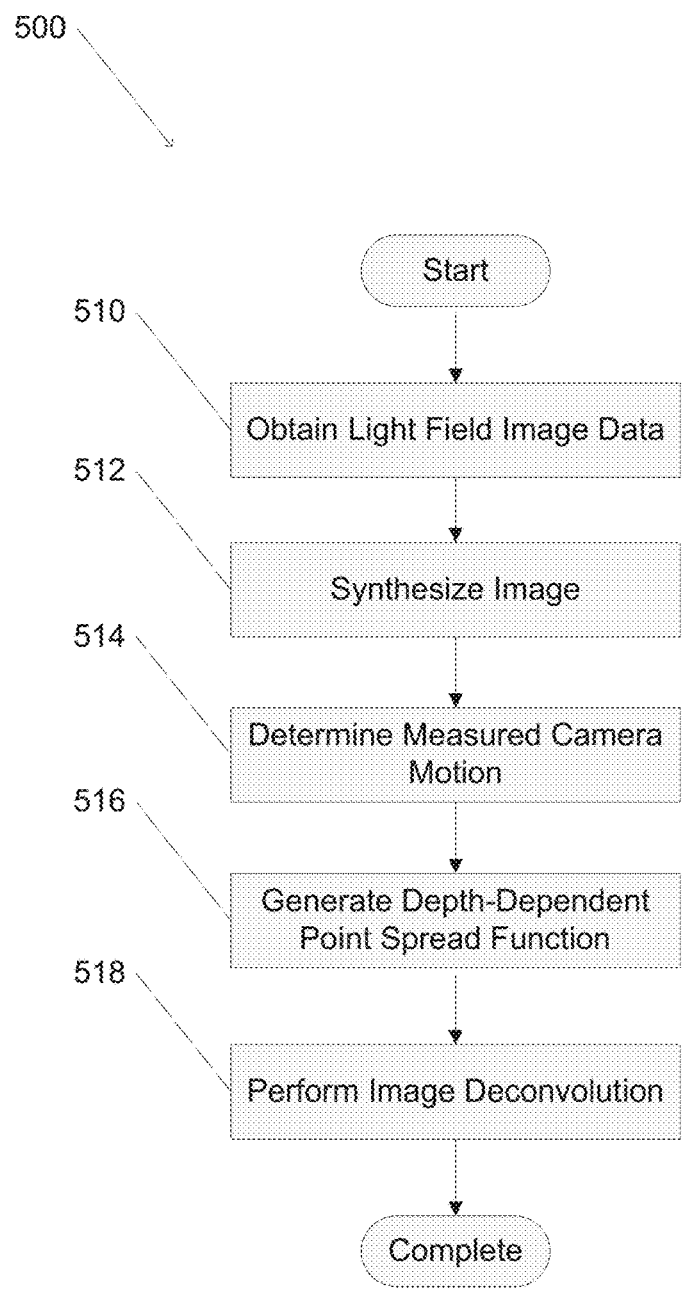
FIG. 5 is a flow chart illustrating a process for image deconvolution of a synthesized image using measured camera motion in accordance with an embodiment of the invention.

Array cameras in accordance with embodiments of the invention are configured to capture motion data describing the motion of the array camera at the time image data is captured. A process for performing image deconvolution using measured motion information in accordance with an embodiment of the invention is illustrated in FIG. 5. The process 500 includes obtaining (510) light field image data and synthesizing (512) an image. The measured camera motion is determined (514), a depth-dependent point spread function is determined (516), and image deconvolution is performed (518).

In a number of embodiments, obtaining (510) light field image data and synthesizing (512) an image are performed utilizing processes similar to those described above. The measured camera motion is determined (514) using motion information contained in the light field image data. In many embodiments, the motion information is directly stored as metadata in the light field image data. In a variety of embodiments, the motion information is determined (514) by correlating motion information along with time information contained in the light field image data. The correlation of the motion information with the time information describes how quickly the array camera moved as packets of image data included in the light field image data were read from the focal planes in the imager array of the array camera. The determined (514) measured motion information and the depth map are utilized to generate (516) the depth-dependent point spread function. In several embodiments, image deconvolution is performed (518) utilizing processes similar to those described above.

A specific process for performing image deconvolution of light field images using depth and camera motion information in accordance with an embodiment of the invention is described above with respect to FIG. 5; however, a variety of processes can be utilized in accordance with embodiments of the invention. Processes for determining the motion of array cameras and generating point spread functions are described below.

Calibrating the Motion of an Array Camera

Figure 6:
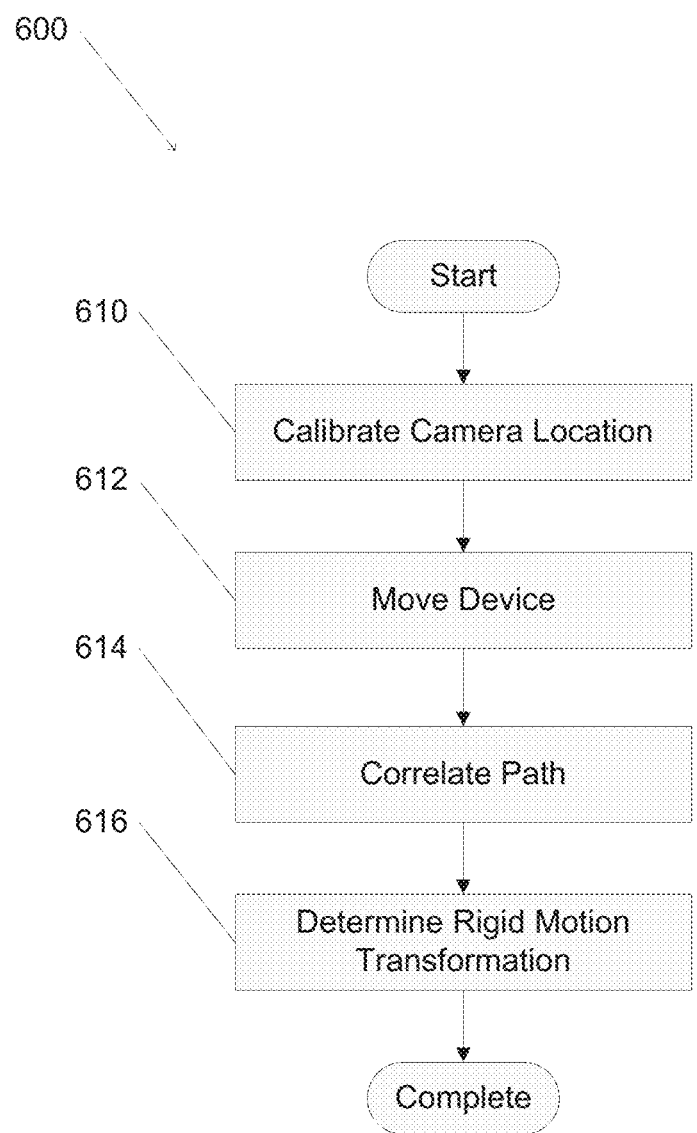
FIG. 6 is a flow chart illustrating a process for determining an a priori rigid motion transformation of an imager array in accordance with an embodiment of the invention.

As discussed above, the motion of an array camera capturing image data is utilized in the deconvolution of images captured using the array camera. Many array cameras include motion sensors configured to determine the motion of the array camera as image data is captured. In order to align the motion sensor to the captured image data, an a priori rigid motion transformation is determined to calibrate the motion data captured by the sensor with the actual movement of the array camera. This a priori rigid motion transformation can be stored in a variety of manners, including as metadata associated with a captured light field, for use in later image processing. A process for determining an a priori rigid motion transformation for use in an array camera configured to perform image deconvolution processes in accordance with an embodiment of the invention is illustrated in FIG. 6. The process 600 includes calibrating (610) the location of an imager array contained in an array camera. The array camera is moved (612). The path of the array camera is correlated (614) with motion information obtained from an inertial measurement sensor. The a priori rigid motion transformation is determined (616).

In a number of embodiments, calibrating (610) the array camera includes performing intrinsic and extrinsic camera calibration. Systems and methods for calibrating a camera module in an array camera are disclosed in U.S. Provisional Patent Application Ser. No. 61/780,748, titled "Systems and Methods for Calibration of an Array Camera" and filed Mar. 13, 2013, the entirety of which is hereby incorporated by reference. In a variety of embodiments, the movement (612) of the camera can be random and/or a pre-determined path. In accordance with many embodiments of the invention, captured light fields contain a two dimensional array of two dimensional images. These two dimensional images contain a plurality of pixels, where each pixel is associated with a coordinate representing where that pixel exists in the captured light field and/or a timestamp representing the time that the pixel was captured. In many embodiments, the array camera captures one or more light fields while the array camera is moved (612). In a variety of embodiments, the path of the array camera as it is moved (612) is determined by mapping the motion of one or more pixels between the captured light fields. In several embodiments, the path of the array camera as it is moved (612) is determined using one or more pixels in a captured light field.

In a variety of embodiments, correlating (614) the motion information to the pixel motion utilizes motion timestamps associated with the captured motion information and pixel timestamps associated with the captured pixels. In a number of embodiments, determining (616) the a priori rigid motion transformation is a function that correlates (614) the motion information to the mapped pixel motion within a predefined error threshold. In many embodiments, the error threshold is dynamically determined. The a priori rigid motion transformation includes, but is not limited to, rotation information and translation information.

In several embodiments, inertial measurement sensors include, but are not limited to, gyroscopes, accelerometers, and magnetometers. In a number of embodiments, an array camera contains a plurality of inertial measurement sensors. In many embodiments, inertial measurement sensors have measurement errors and/or accumulate errors over time due to sensor noise. In accordance with embodiments of the invention, the path of the array camera can be correlated (614) using one or more pixels in each captured light field. By correlating (614) the motion data with the pixels in successive captured light fields, errors due to inertial measurement sensor error can be held within a predefined margin of error. In many embodiments, correlating (614) the motion data is performed using pixels in a single captured light field. In several embodiments, the margin of error is dynamically determined. In several embodiments, the process 600 can be performed once, for example, at the time the array camera is manufactured. In a variety of embodiments, process 600 can be performed during the use of the array camera to refine the calibration of the motion sensor by updating the a priori rigid motion transformation based on changes in the array camera.

A specific process for determining an a priori rigid motion transformation for use in an array camera configured to perform image deconvolution processes in accordance with an embodiment of the invention is described above with respect to FIG. 6; however, a variety of processes can be utilized to determine a priori rigid motion transformations as appropriate to the requirements of a specific application in accordance with embodiments of the invention. Processes for generating point spread functions in accordance with embodiments of the invention are discussed below.

Generating a Point Spread Function

A PSF describes the response of an imaging system to a point object. For example, an imaging system may not be able to precisely capture a point object, resulting in the blurring of the point object across more than one pixel on a focal plane of an imager array. In images with depth information, the blurring of point objects depends on the depth of the point object from the focal plane of the image. Image deconvolution devices configured to perform image deconvolution processes in accordance with embodiments of the invention utilize depth-dependent PSFs to correct for the blurring of point objects in synthesized images based on the depth of the point objects within the synthesized image.

Figure 7:
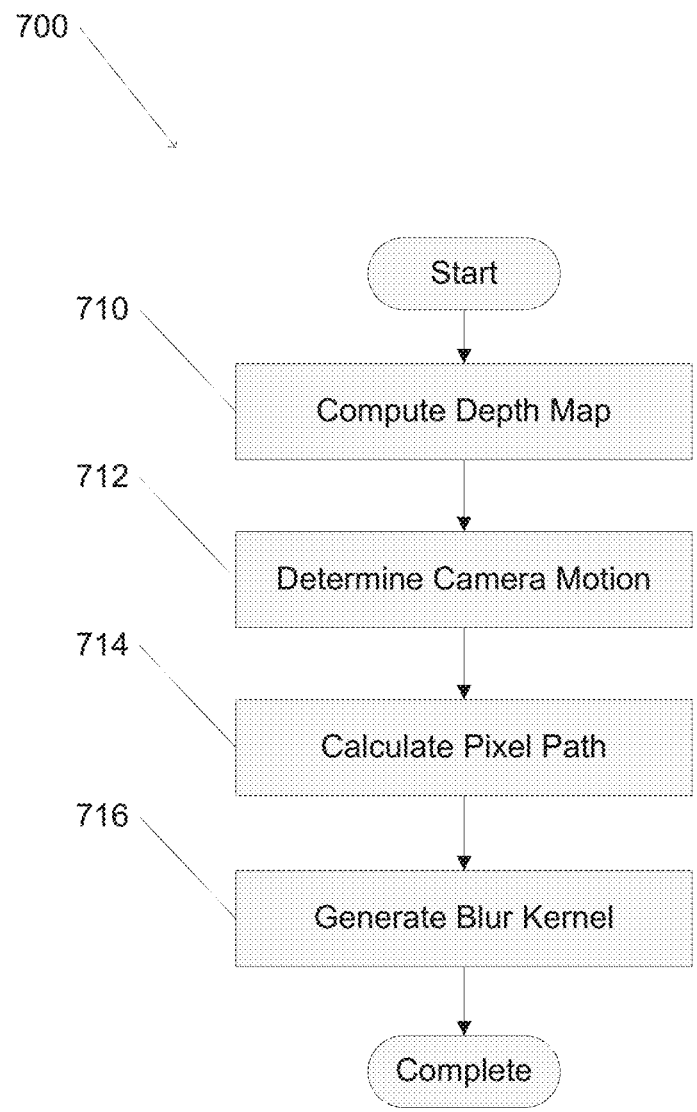
FIG. 7 is a flow chart illustrating a process for generating a depth-dependent point spread function in accordance with an embodiment of the invention.

A process for generating a point spread function using depth information in accordance with an embodiment of the invention is illustrated in FIG. 7. The process 700 includes computing (710) a depth map for a captured light field. Camera motion is determined (712). The pixel path is calculated (714) for one or more pixels in the captured light field. A blur kernel is generated (716) for the one or more pixels.

Systems and methods for computing (710) depth maps that can be utilized in accordance with a variety of embodiments of the invention are described in U.S. patent application Ser. No. 13/972,881, incorporated by reference above. Other systems and methods for computing (710) depth maps can be utilized in accordance with the requirements of a number of embodiments of the invention. In many embodiments, camera motion is determined (712) using an inertial measurement sensor. In several embodiments, processes similar to those described above can be utilized to determine (712) camera motion. In a number of embodiments, camera motion is determined using ego-motion estimation algorithms. In many embodiments, generating (714) the pixel path involves determining the movement of one or more pixels in a scene using the camera motion. In a number of embodiments, the camera motion is an a priori rigid motion transformation generated using a process such as that described above. In several embodiments, the blur kernel is generated (716) using the pixel path calculated (714) for the one or more pixels. In many embodiments, the calculated (714) pixel path and the blur kernel generated (716) are for pixels at varying depth levels in the captured light field. In a variety of embodiments, the blur kernel is generated (716) utilizing pixel timestamps associated with one or more pixels and/or motion timestamps associated with motion data captured using the inertial measurement sensor.

A point p in a scene is located at a location p(x,y,z), where (x,y,z) represents the three-dimensional location of the point in the scene. Applying an a priori rigid motion transformation having rotation R and translation T to a point p in a light field will result in the point p moving to $$M_{R,T}(p)(RT)p$$

and the imaged position q=P(x,y,z) will move to $$PM_{R,T}(p)$$

where P is the projective transformation of the array camera capturing the light field. In several embodiments, the projective transformation of the array camera includes scene independent geometric corrections and scene dependent geometric transformations of the array camera as described in U.S. Provisional Patent Application Ser. No. 61/780,748, the entirety of which is incorporated by reference above.

An a priori rigid motion transformation $M_{R,T}$ is represented by a rotation $R_n$ and a translation $T_n$ for a time sampling period N=1, ... , n. Applying the a priori rigid motion transformation to pixel p over the time sampling period calculates (714) pixel path $$q_n = PM_n(p)$$

where $$M_n(p) = P(R_n T_n \ldots R_1 T_1)$$

Point spread functions contain a blur kernel that describes the response of the array camera to a point object. In accordance with embodiments of the invention, the blur kernel K for a pixel path $q_n$ for a time sampling period N=1, ... ,n is generated (716) using the formula $$K = c \sum_{n=1}^{N} G(q_n - q_1, \sigma)$$

where c is a nominalization constant and $G(q_n-q_1,\sigma)$ is a two dimensional radial symmetric Gaussian distribution with mean $q_n-q_1$ and standard deviation $\sigma$. In a number of embodiments, $G(q_n-q_1,\sigma)$ is a variety of probability distributions known to those of ordinary skill in the art. In several embodiments, applying the Gaussian distribution to the pixel path generates (716) a depth-dependent spatially varying blur kernel utilized in a PSF for each pixel depending on the depth of the pixel in the light field. In many embodiments, the depth of each pixel is determined using parallax information determined using processes as described in U.S. patent application Ser. No. 13/972,881, the entirety of which is incorporated by reference above.

A specific process for generating a point spread function using depth information in accordance with an embodiment of the invention is described above with respect to FIG. 7; however, a variety of processes can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An array camera, comprising:
    a processor; and
    a memory connected to the processor and configured to store an image deconvolution application;
    wherein the image deconvolution application configures the processor to:
        obtain light field image data, where the light field image data comprises an image having a plurality of pixels and a depth map;
        determine motion data by applying ego-motion techniques to estimate motion data by:
            detecting features in a first image and matching those features to a second image; and
            generate an optical flow describing the estimate of the motion of the array camera;
        generate a depth-dependent point spread function based on the image, the depth map, and the motion data;
        measure the quality of the image based on the generated depth-dependent point spread function;
        when the measured quality of the image is within a quality threshold, incorporate the image into the light field image data.

2. The array camera of claim 1, further comprising an array camera module comprising an imager array having multiple focal planes and an optics array configured to form images through separate apertures on each of the focal planes;
    wherein the array camera module is configured to communicate with the processor; and
    wherein the obtained light field image data comprises image data captured by the imager array.

3. The array camera of claim 1, wherein the image deconvolution application configures the processor to:
when the measured quality of the image is outside the quality threshold;
determine updated motion data based on the measured quality and the depth-dependent point spread function;
generate an updated depth-dependent point spread function based on the updated motion data; and
synthesize a new image based on the updated depth-dependent point spread function.

4. The array camera of claim 1, wherein the light field image data further comprises metadata describing the motion associated with the array camera that captured the light field image data, wherein the image deconvulation application configures the processor to further determine motion data based on the metadata contained in the light field image data, wherein the metadata is obtained from an inertial movement sensor that captures motion information related to rotation and translation of the array camera.

5. The array camera of claim 4, wherein the inertial measurement sensor is selected from the group consisting of a gyroscope and a microelectromechanical system (MEMS) accelerometer, an accelerometer, and a magnetometer.

6. The array camera of claim 4, wherein the inertial measurement sensor is integrated into the array camera.

7. The array camera of claim 4, wherein the metadata further comprises a timestamp associated with the motion.

8. The array camera of claim 1, wherein the quality threshold is dependent on a sharpness of the image.

9. The array camera of claim 1, wherein determining motion data further comprises correlating motion information along with time information contained in the light field image data, wherein the correlation describes how quickly the array camera moved as packets of image data included in the light field image data were read from cameras in the array camera.

10. The array camera of claim 1, wherein the image deconvolution application configures the processor to calibrate the array camera by performing intrinsic and extrinsic camera calibration.

11. The array camera of claim 1, wherein the point spread function includes a blur kernel that describes the response of the array to a point object.

12. The array camera of claim 11, wherein the blur kernel is generated using a pixel path calculated for at least one pixel.

13. The array camera of claim 12, wherein a point p in a scene is located at a location p(x, y, z), where (x, y, z) represents a three-dimensional location of the point in the scene, wherein the image deconvolution application configures the processor to apply an a priori rigid motion transformation having rotation R and translation T to a point p in a light field that results in the point p moving to:

$$M_{R,T}(p)=(RT)p$$

and the imaged position q=P(x, y, z) move to:

$$PM_{R,T}(p)$$

where P is the projective transformation of the array camera capturing the light field.

14. The array camera of claim 12, wherein a point p in a scene is located at a location p(x, y, z), where (x, y, z) represents a three-dimensional location of the point in the scene, and wherein an a priori rigid motion transformation $M_{R,T}$ is represented by a rotation $R_n$ and a translation $T_n$ for a time sampling period N=1, ..., n, wherein the image deconvolution application configures the processor to apply an a priori rigid motion transformation to pixel p over the time sampling period by calculating pixel path:

$$q_n = PM_n(p)$$

where:

$$M_n(p) = P(R_n T_n \ldots R_1 T_1).$$

15. The array camera of claim 12, wherein the point spread functions contain a blur kernel that describes the response of the array camera to a point object, wherein the blur kernel K for a pixel path $q_n$ for a time sampling period N=1, ..., n is generated using the formula:

$$K = c \sum_{n=1}^{N} G(q_n - q_1, \sigma)$$

where c is a nominalization constant and $G(q_n-q_1,\sigma)$ is a two dimensional radial symmetric Gaussian distribution with mean $q_n-q_1$ and standard deviation $\sigma$.

16. A method for performing image deconvolution, comprising:
obtain light field image data using an array camera having a plurality of cameras, wherein the light field image data comprises an image having a plurality of pixels and a depth map;
determine motion data by applying ego-motion techniques to estimate motion data by:
detecting features in a first image and matching those features to a second image; and
generate an optical flow describing the estimate of the motion of the array camera;
generate a depth-dependent point spread function based on the image, the depth map, and the motion data;
measure the quality of the image based on the generated depth-dependent point spread function; and
when the measured quality of the image is within a quality threshold, incorporate the image into the light field image data.

17. The method of claim 16, further comprising:
when the measured quality of the image is outside the quality threshold;
determine updated motion data based on the measured quality and the depth-dependent point spread function;
generate an updated depth-dependent point spread function based on the updated motion data; and
synthesize a new image based on the updated depth-dependent point spread function.

18. The method of claim 16, wherein the light field image data further comprises metadata describing the motion associated with the array camera that captured the light field image data, wherein the method further comprises determining motion data based on the metadata contained in the light field image data, wherein the metadata is obtained from an inertial movement sensor that captures motion information related to rotation and translation of the array camera.

19. The method of claim 18, wherein the inertial measurement sensor is selected from the group consisting of a gyroscope and a microelectromechanical system (MEMS) accelerometer, an accelerometer, and a magnetometer.

20. The method of claim 16, wherein determining motion data further comprises correlating motion information along with time information contained in the light field image data, wherein the correlation describes how quickly the array camera moved as packets of image data included in the light field image data were read from cameras in the array camera.

* * * * *